Sept. 17, 1963 H. A. KHOURY ETAL 3,103,850

PNEUMATICALLY OPERATED DOCUMENT SENSING STATION

Filed Dec. 14, 1961 2 Sheets-Sheet 1

INVENTORS
HENRI A. KHOURY
RICHARD K. WILMER

BY Joe L. Koerber
ATTORNEY

Sept. 17, 1963 H. A. KHOURY ETAL 3,103,850

PNEUMATICALLY OPERATED DOCUMENT SENSING STATION

Filed Dec. 14, 1961 2 Sheets-Sheet 2

3,103,850

PNEUMATICALLY OPERATED DOCUMENT SENSING STATION

Henri A. Khoury, Yorktown Heights, and Richard K. Wilmer, Mohegan Lake, N.Y., assignors to International Business Machines Corporation, New York, N.Y., a corporation of New York Filed Dec. 14, 1961, Ser. No. 159,250
9 Claims. (Cl. 88—24)

This invention relates to a document sensing station and more particularly to a sensing station in which an optical sensing device is automatically brought into focus with recorded data on a document when the document is introduced into the station.

In general, an information retrieval system must be capable of storing large quantities of information in a relatively small space. The requirement for small space necessitates some form of compacting of information, for example, microphotographing of documents.

The system preferably should be capable of locating desired information in a very short period of time, thus requiring not only rapid location of the particular information but rapid positioning of that information at a sensing or retrieval station.

The prior are includes photographically recorded information on rolls of film which are reeled to position a desired frame at a sensing station. Film strips also have been used where a selected strip is mechanically engaged and drawn to a sensing station.

In the present invention, film strips containing a photographic emulsion with greatly minified document images recorded therein are transported to the sensing station by air jets, in free flight and at high speeds. The film is supported in the sensing station on air films in accordance with air bearing principles.

Due to the extremely short focal tolerance of the lens which must be used to project an image of the desired document from the film, the permissible gap in the sensing station during projection is extremely narrow. Introducing the film strip from the transport apparatus into such a narrow gap in the sensing station at high speed may cause rubbing and scraping thereby damaging the emulsion. The present invention provides a wider sensing station gap which is automatically reduced to the desired gap width after a document is introduced. The lens which is mounted in a movable member forming one side of the gap is also automatically brought into focus by the narrowing of the gap.

Accordingly, a primary object of this invention is to provide improved apparatus for detecting the introduction of a document into a document station.

Another object of this invention is to provide apparatus for changing the gap at a document station when a document is introduced therein.

A further object of this invention is to provide apparatus for changing the gap at a document station when a document is removed therefrom.

Yet another object of this invention is to provide apparatus at a document station for moving a lens into focus when a document is introduced into the station.

Another object of this invention is to provide a document station operable in response to a pressure change caused by introduction of a document into a document gap at the station to change the document gap whereby a transducer is brought within sensing range of the document.

A still further object of this invention is to provide apparatus operating on the Bernoulli principle for detecting the introduction of a document into a sensing station and for bringing an optical device into focus with a document.

The foregoing and other objects, features and advantages of the invention will be apparent from the following more particular description of a preferred embodiment of the invention, as illustrated in the accompanying drawings.

Figure 1:
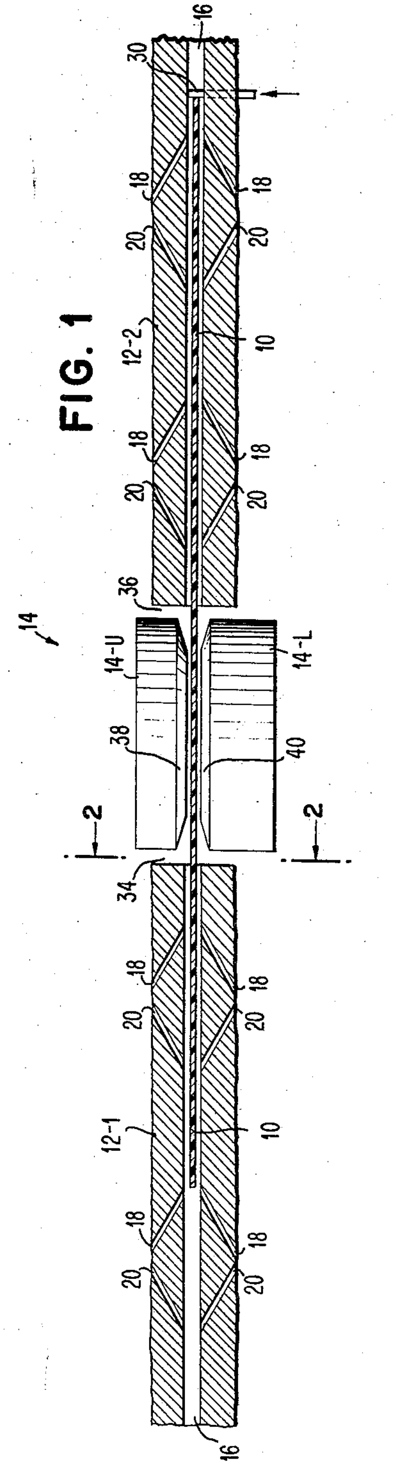
FIGURE 1 is a schematic showing of a film transport and a sensing station.

Referring to FIGURE 1, a film transport and a sensing station are provided. A film strip 10 is fed by a transport device generally designated 12 for positioning at a sensing station 14. When a film strip is positioned in the sensing station 14, the sensing station gap is closed to bring a transducer into focus with the film strip.

The pneumatic transport chute 12 consists of a left-hand portion 12—1 and a right-hand portion 12—2. The sensing or retrieval station 14 is located between the two portions of the chute 12. The left-hand portion 12—1 of the transport chute consists of a pair of rails 12–1*a* and 12–1*b*, FIGURE 2, each rail having a channel 16 into which the edges of the film strip 10 are recessed.

Each portion of the transport chute 12 is identical and therefore only one is described. The chute 12 per se is not considered inventive and only those portions immediately adjacent the station 14 and the channels 16 are shown, the remaining being broken away. The chute may be made of metal or any other suitable material.

The film is driven by jets of air introduced into the channels 16 by way of angled orifices 18 for driving the film strip in one direction and angled orifices 20 for driving the film strip in the opposite direction. One pneumatic manifold (not shown) is provided for supplying pressurized air to the orifices 18 and a second manifold (not shown) is provided for supplying air to the orifices 20. The exact manner in which the manifolds are connected to their respective orifices is of no importance to the invention and therefore is not shown. Also not shown are the means for switching air to one manifold or the other.

The orifices 18 and 20 are bored at an angle of 30° to the longitudinal axis of the channels 16. The orifices nearest the sensing station 14 are spaced approximately .25 inch from the end of chute 12. Additional orifices are provided spaced about one inch apart.

Figure 2:
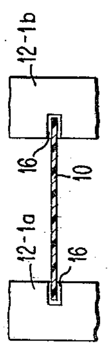
FIGURE 2 is a view taken along the line 2—2 showing an end view of the transport system.

The film strip 10 may consist of a piece of photographic emulsion coated film measuring, for example, 6 inches long by 16 millimeters wide by .005 inch thick. The two opposed rails 12–1*a* and 12–1*b*, see FIGURE 2, are spaced apart, by means not shown, a distance of 16 millimeters plus .006 inch, thus providing a clearance of .003 inch on either side of the film strip. The width of the channels 16 may be .041 inch thus providing a clearance of .003 inch above and below the film strip.

Figure 4:
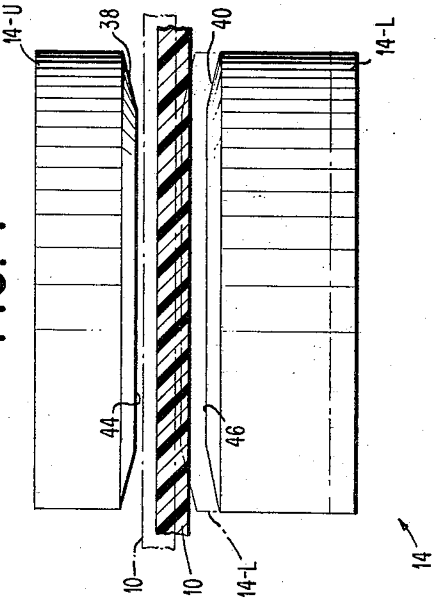
FIGURE 4 is an enlarged view of the schematically represented sensing station of FIGURE 1.
Figure 3:
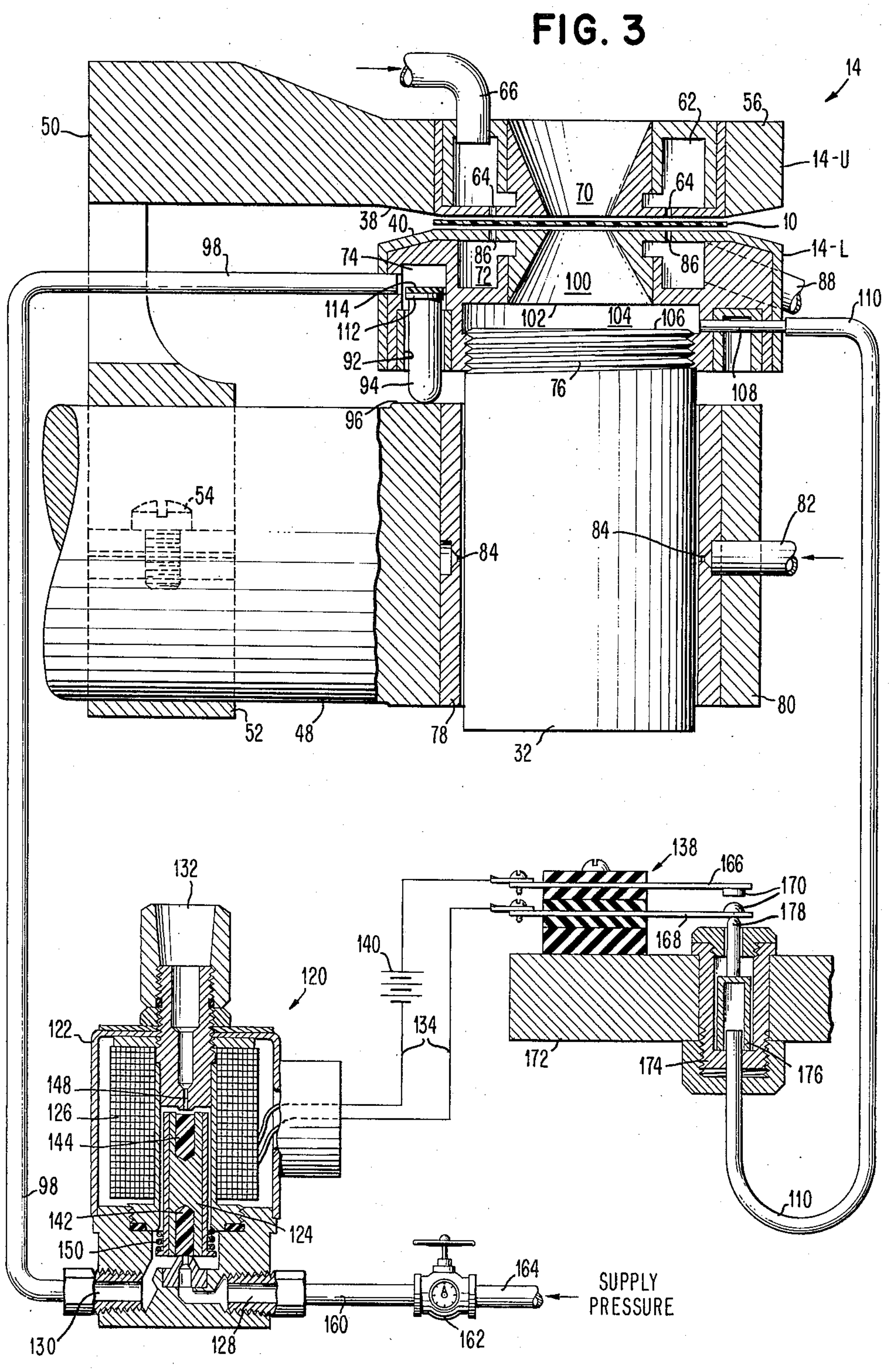
FIGURE 3 shows the actual structure of the sensing station and the actuating mechanism and circuits therefor.

The sensing station 14 is shown schematically in FIGURES 1 and 4 and is shown in detail in FIGURE 3. The sensing station consists of an air bearing assembly comprising an upper bearing element 14–U and a lower bearing element 14–L. The upper element 14–U is fixed relative to the transport chute 12, whereas the lower element 14–L is moveable vertically.

Before a film strip 10 is loaded into the sensing station 14, the gap between the elements 14–U and 14–L is .011 inch. This is equal to the width of the channels 16 and the gap is aligned with the channels. A film strip driven through the left-hand portion of the chute 12—1 enters the gap in the sensing station 14 and continues into the right-hand portion of the chute 12—2 until it comes against a stop 30 which is interposed to position a particular microphotograph image at the station 14.

When the film strip is introduced into the station 14, the lower element 14–L is automatically raised to reduce the spacing between the elements 14–U and 14–L from .011 inch to .007 inch, thus bringing a lens 32, shown in FIGURE 3, into focus with the microphotograph image.

The wide gap, .011 inch, in the sensing station is provided to permit the film strip 10 to be inserted at high speed from the left-hand portion 12—1 of the transport chute across a gap 34 to the sensing station 14 and across a gap 36 to the right-hand portion 12—2 of the chute. If the elements 14–U and 14–L were spaced more closely together, the film strip 10 might strike the edges of these elements and mar the emulsion on the film strip. It is noted that the upper element 14–U has a bevelled surface 38 and the lower element 14–L has a bevelled surface 40 to facilitate entry of the film into the sensing station.

As soon as the leading edge of the film strip 10 enters the sensing station 14, a change in air pressure is effected which actuates a mechanism to raise the lower element 14–L a predetermined distance to bring the lens 32 into focus with the image. Referring to FIGURE 4, the sensing station 14 is shown schematically to a larger scale. The full line showing of the element 14–L is the position prior to introduction of the film strip 10. At that time the surfaces 44 and 46 are spaced apart .011 inch and the film strip 10 assumes a position equidistant between these elements. Since the film strip is .005 inch thick, a clearance of .003 inch is provided on either side.

After the film strip 10 is inserted into the sensing station, the element 14–L is raised to the position shown by the dotted outline in FIGURE 4. The film strip also is moved to its dotted outline position, again assuming a position equidistant between the surfaces 44 and 46. At this point the spacing of the surfaces 44 and 46 is .007 inch and a space approximately .001 inch wide is provided on either side of the film strip. This spacing is calculated to place the lens 32 carried by the element 14–L in focus with the image. The foregoing spacings between the film strip 10 and the surfaces 44 and 46 may be finely adjusted or controlled by varying air pressure as described hereinafter.

Referring to FIGURE 3, an enlarged sectional view of the sensing station 14 is shown. The upper air bearing element 14–U is supported on an arm 48 by means of an L-shaped bracket 50. The bracket 50 has a half-ring formed on the lower end and is fixed to the arm 48 by means of another half-ring 52 and a pair of screws 54 (one shown). The upper element 14–U is mounted by means of a ring 56 formed in the end of the bracket 50. The ring 56 is co-extensive with the width of the lower element 14–L and the lower edge forms the bevelled surface 38 referred to hereinbefore.

A circular internal chamber 62 in the element 14–U is connected to the lower surface 44 by eight orifices 64 which are equally spaced in a circular arrangement concentric with the surface 44. Air is supplied at a constant pressure to the chamber 62 through a tube 66. Air flows from the chamber 62 through the orifices 64 which are perpendicular to the surface 44 and exert a pressure on a film strip 10 interposed between the elements 14–U and 14–L or, in the absence of the film strip, on the lower element 14–L. An opening 70 in the shape of an inverted truncated cone is provided extending through the element 14–U. Air directed from the orifices 64 escapes radially outward through the gap between surfaces 44 and 46, and inwardly through the opening 70.

The flat surface 44 of the element 14–U is approximately .625 inch in diameter and the diameter from the outer edge of the bevel surface 38 is approximately .875 inch. The orifices 64 are .009 inch in diameter.

The lower element 14–L consists of an upper air bearing portion having two separate internal chambers 72 and 74 and a lower portion which is the lens 32. The lens 32 is mounted on the upper portion by threads 76. The element 14–L is supported by means of the lens 32 in a cylindrical air bearing 78 which is mounted in a ring 80 formed on the end of the arm 48. Air is supplied to the bearing 78 through a tube 82 and orifices 84 arranged around the periphery of the bearing.

The internal circular chamber 72 is connected to the upper surface 46 of the element 14–L by eight orifices 86 which are identical in size and arrangement to the orifices 64 in the upper element 14–U. Air is supplied at a constant pressure to the chamber 72 through a tube 88. The pressure applied to chambers 62 and 72 is equal to provide equal spacing of the film strip 10 from the surfaces 44 and 46.

The internal channel 74 forming at least 240° of a circle is connected through the lower surface of the element 14–L by three holes 92 spaced 120° apart. Three pistons 94 (one shown) extend from the internal chamber 74 through the holes 92 and rest on a flat upper surface 96 of the ring 80. Air is supplied to the chamber 74 through a tube 98. An opening 100 in the form of a truncated cone extends from the upper surface 46 of the element 14–L to an inner surface 102. An air chamber 104 is provided between the surface 102 and the upper surface 106 of the lens 32. The chamber 104 is connected by a tube 108 to the outer surface of the element 14–L. A tube 110 is connected to the tube 108.

Each piston 91 is .074 inch in diameter and has a flange 112 on the upper end to retain it in the hole 92. A rubber element 114 forming a partial circle co-extensive with the channel 74 is glued to the tops of the three pistons 94 to prevent rotation of the pistons and consequent noise and vibration. Air supplied through the tube 98 bears on the top side of the rubber element and consequently exerts a force on the tops of the pistons 94. Since the bottom of the pistons 94 rest on the surface 96, a pressure applied to the tops of the pistons has the effect of lifting the element 14–L away from the surface 96.

With pressure applied to the tubes 66 and 88, air flows into the internal chambers 62 and 72, through the orifices 64 and 86 against both surfaces of a film strip 10 (if it is present), outwardly over the bevelled edges 38 and 40 and inwardly to the openings 70 and 100. In thus flowing, the air exerts stabilizing forces on the film strip between the elements 14–U and 14–L, maintaining the film strip substantially equidistant from the two elements.

A detailed description of the sensing station 16 is included in application Serial No. 120,404, filed June 28, 1961 on behalf of H. A. Khoury and entitled, "Method and Apparatus for Obtaining and Maintaining Spacing of a Transducer" now Patent 2,081,682. That patent is assigned to the assignee of the present invention. Reference may be made to that patent for additional details as to the construction of the sensing station.

Also shown in FIGURE 3 is a pneumatic valve 120. The valve consists of an outer shell 122, a solenoid plunger 124, a coil 126, an inlet port 128 and outlet ports 130 and 132. A pair of leads 134 connect the coil 126 through a switch 138 to a source of potential represented as a battery 140. The plunger 124 carries seal elements 142 and 144. In the lower, de-energized position of a plunger 124, the seal 142 fits against a valve seat 146 closing off the inlet 128.

In this position of the plunger, a passage is provided from the outlet port 130 around the sides of the plunger 124 to a bore 148 leading to the outlet 132. In the energized position, the plunger 124 is raised, pressing the seal 144 over the bore 148 thus shutting off the outlet 132 and raising the seal 142 from the valve seat 146 whereby a passage is provided from the inlet 128 to the outlet 130. A spring 150 is provided for restoring the plunger 124 to its lower position when the coil 126 is de-energized.

The outlet 130 is connected to the tube 98 leading to the piston chamber 74 of element 14–L. The inlet 128 is connected by a tube 160, through a pressure regulator 162 and a tube 164 to a source of air pressure. Such pressure regulators are well-known commercially available devices.

The leads 134 of the coil 126 are connected to contact straps 166 and 168 of the switch 138. Each strap carries a contact, the pair of contacts being designated 170. The contact straps 166 and 168 are insulated from one another and mounted on a support 172. Also mounted on the support 172 is a piston cylinder 174 containing a piston 176. The piston is moveable vertically in the cylinder 174 and has a projecting tip 178 which extends from the cylinder whereby, in its raised position, it moves the lower contact strap 168 to bring the contacts 170 together thereby closing the circuit for energizing the coil 126. The cylinder 174 is connected by the tubes 108 and 110 to the chamber 104 in the element 14–L.

*System Operation*

In the starting condition, air is applied to the tubes 66, 88, 82 and 164. The contacts 170 are open. The solenoid coil 126 is de-energized and the lower element 14–L is in its down position.

Figure 5:
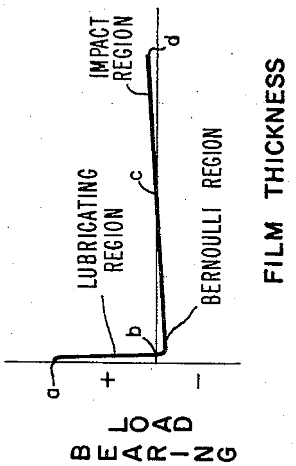
FIGURE 5 is a bearing load versus air film thickness diagram.

Air is applied to the orifices 18 to feed a film strip 10 to the sensing station 14 where it is positioned by the stop element 30. Prior to arrival of the film strip 10 at the sensing station, a predetermined pressure created by the air flow from orifices 64 and 86 exists in the chambers 100—104. This pressure is very low and possibly negative i.e., in the Bernoulli region of the curve shown in FIGURE 5.

This curve is divided into three regions, the first, the lubricating region extending from point *a* to point *b*; the second, the Bernoulli region, extending from point *b* to point *c*; and the third, the impact region extending from point *c* to point *d*. The lubricating region *a*—*b* illustrates an area in which a given nozzle pressure will keep a surface a given distance from the nozzle. In accordance with Bernoulli principle, under steady condition, the externally pressurized gas film force between parallel surfaces goes from positive to negative to positive as the space between the surfaces increases from zero. When spacings are small, there is a large negative load gradient which increases with increasing film thickness. This is the lubricating region in which the stiffness of the gas film acts to give a restoring force if the surfaces are displaced from steady conditions. The Bernoulli region is that region in which the force is attractive. In most of this region the load gradient is positive, corresponding to negative stiffness. When the spacing between the surfaces is large enough, there is only a jet impact, and the force is again positive.

When a film strip 10 enters the gap, the gap width is thereby reduced from .011 inch to .003 inch on either side of the film strip. This reduction in gap width effects the pressure build-up which is transmitted through the chambers 100—104, and tubes 108 and 110 to the piston cylinder 174. The piston 176 is extremely light, in the order of 1–2 grams, and is raised by the pressure applied thereto. The piston tip 178 moves the strap 168 to close the contacts 170. A circuit is thereby completed to energize the coil 126 and raise the solenoid plunger 124 to permit a flow of pressurized air through the valve 120 and tube 98 to the piston chamber 74 to the piston. As described hereinbefore the pressure applied to this piston chamber effects the raising of the element 14–L a distance calculated to bring the lens 32 into focus with an image in the emulsion on the lower side of the film strip.

When the film strip is to be removed from the sensing station 14, the air pressure is removed from orifices 18 and applied to orifices 20 to remove the film strip 10 from the sensing station 14. As soon as the end of the film strip uncovers the chamber 100, the pressure is again reduced permitting the piston 176 to return to its normal down position under control of gravity and the spring effect of the strap 168. When the contacts 170 open, the coil 126 is de-energized and the plunger 124 is returned to its down position by the spring 150 thus cutting off the supply of air to the piston chamber 74. Due to the leakage of air from the outlet 130 to the outlet 132, the pressure in chamber 74 bleeds off or exhausts through the outlet 132 permitting the element 14–L to drop to its down position.

While specific measurements are given for the disclosed structure and film strip, they are only exemplary and are not to be considered as limiting the invention. If a film strip of a different thickness is to be used, it may be desirable to change some of the structural dimensions. Similarly, if the lens has a different focal length, it may be necessary to change the piston pressure and/or the pressures in chambers 62 and 72.

In the aforementioned patent it is described in detail, with reference to a family of curves, how the gap and bearing stiffness may be varied by varying the pressure applied to the piston chamber 74 and to the chamber 72.

While the invention has been particularly shown and described with reference to a preferred embodiment thereof, it will be understood by those skilled in the art that various changes in form and details may be made therein without departing from the spirit and scope of the invention.

What is claimed is:

1. Document handling apparatus comprising, in combination, a document station consisting of a pair of air bearing elements having opposed parallel surfaces with an air gap therebetween into which air jets are directed from each of said parallel surfaces creating a given pressure level, means for moving a document into said air gap thus reducing said air gap and increasing said pressure level, and means operable in response to said increase in pressure level for moving one of said elements in a direction to further reduce said air gap.

2. Document handling apparatus comprising, in combination, a document station consisting of a pair of air bearing elements having opposed parallel surfaces with an air gap therebetween into which air jets are directed from each of said parallel surfaces creating a given pressure level, means for moving a document into said air gap thus reducing said air gap and increasing the said pressure level, and means operable in response to said increase in pressure level for applying air pressure to move one of said elements in a direction to further reduce said air gap.

3. Document handling apparatus comprising, in combination, a document station consisting of a pair of air bearing elements having opposed parallel surfaces with an air gap therebetween into which air jets are directed from each of said parallel surfaces creating a given pressure level, one of said elements having a chamber containing pistons operable by pressure applied to said chamber to move last said element toward the other said element, means for moving a document into said air gap thus reducing said air gap and increasing the said pressure level, and means operable in response to said increase in pressure level for applying air pressure to said chamber.

4. The apparatus of claim 3 wherein last said means includes means for controlling said applied pressure whereby the amount of movement of said one element may be predetermined.

5. Document handling apparatus comprising, in combination, a first air bearing element having an internal chamber and a plane surface with orifices connecting said chamber and said surface, a second air bearing element having a first and a second internal chamber, a plane surface with orifices connecting said first chamber and last said plane surface, and pistons extending through openings in a surface opposite said plane surface into said second chamber, means fixedly mounting said first element, means mounting said second element adjacent to said first element with said plane surfaces parallel and separated by an air gap, with said pistons resting on said mounting means, said second element being moveable along an axis perpendicular to said parallel surfaces, means for applying pressure to both said internal channels which are connected with said orifices to direct air jets from said parallel surfaces into said air gap creating a given pressure level, means operable to apply pressure to said second chamber of said second element for moving said second element by means of said pistons along said axis to reduce said air gap, means for moving a document into said air gap, reducing said gap and increasing said pressure level, and means operable in response to said increase in pressure level for operating said operable means.

6. Document handling apparatus comprising, in combination, a first air bearing element having an internal chamber and a plane surface with orifices connecting said chamber and said surface, a second air bearing element having a first and a second internal chamber, a plane surface with orifices connecting said first chamber and last said plane surface, and pistons extending through openings in a surface opposite said plane surface into said second chamber, means fixedly mounting said first element, means mounting said second element adjacent to said first element with said plane surfaces parallel and separated by an air gap, with said pistons resting on said mounting means, said second element containing a lens the plane of which is parallel to said plane surfaces and being moveable along an axis perpendicular to said parallel surfaces, means for applying pressure to both said internal channels which are connected with said orifices to direct air jets from said parallel surfaces into said air gap creating a given pressure level, means operable to apply pressure to said second chamber of said second element for moving said second element by means of said pistons along said axis to reduce said air gap, means for moving a document into said air gap, reducing said gap and increasing said pressure level, means operable in response to said increased pressure for operating said operable means, and means for controlling said pressure applied to said second chamber to effect movement of said lens to a distance from said document equal to the optimum focal length of said lens.

7. Document handling apparatus comprising, in combination, a document station consisting of a pair of air bearing elements having opposed parallel surfaces with an air gap therebetween into which air jets are directed from each of said parallel surfaces creating a given pressure level, means for moving a document into and out of said air gap thus respectively reducing and increasing said air gap and respectively increasing and decreasing said pressure level, means operable in response to said increase in pressure level for applying air pressure to move one of said elements in a direction to reduce said air gap and operable in response to said decrease in pressure level for removing air pressure to permit said element to be moved by back pressure from said air jets in said one element to increase said air gap.

8. Document handling apparatus comprising, in combination, a first air bearing element having an internal chamber and a plane surface with orifices connecting said chamber and said surface, a second air bearing element having a first and a second internal chamber, a plane surface with orifices connecting said first chamber and last said plane surface and pistons extending through openings in a surface opposite said plane surface into said second chamber, a bracket fixedly mounting said first element, a bracket mounting said second element adjacent to said first element with said plane surfaces parallel and separated by an air gap, with said pistons resting on a surface of last said mounting bracket, said second element being moveable in said bracket along an axis perpendicular to said parallel surfaces, means for applying pressure to both said internal channels which are connected with said orifices to direct air jets from said parallel surfaces into said air gap creating a given pressure level, a valve operable to apply pressure to said second chamber of said second element for moving said second element by means of said pistons along said axis to reduce said air gap, means for moving a document into said air gap, reducing said gap and increasing said pressure level, means operable in response to said increase in pressure level for operating said valve.

9. The apparatus of claim 8 wherein said valve is electrically operated and last said means include a pressure operated piston for closing a contact completing an electric circuit for operating said valve.

No references cited.